INVENTORS
FLOYD B. MASON
CHARLES C. HUEY

BY

Moody & Anderson

AGENTS

United States Patent Office 3,356,926
Patented Dec. 5, 1967

3,356,926
VOLTAGE DOUBLER RECTIFIER WITH CONSTANT VOLTAGE AND VARIABLE OUTPUT VOLTAGE
Floyd B. Mason, Garland, and Charles C. Huey, Richardson, Tex., assignors to Collins Radio Company, Cedar Rapids, Iowa, a corporation of Iowa
Filed Feb. 2, 1966, Ser. No. 524,545
9 Claims. (Cl. 321—15)

This invention relates generally to a voltage rectifier and more particularly to a voltage doubler incorporating means by which the output may be varied independently of the supply voltage. More particularly, the present invention provides for a voltage doubling action in a rectifying circuitry with means provided to vary the voltage doubler output voltage without variation of the source voltage.

An object of the present invention is to provide a rectifier circuitry which produces a first output proportional to the full wave rectification of a power supply secondary winding voltage and a second output proportional to twice the secondary winding voltage with provision for selective variation of the second output without variation in the supply voltage.

The present invention finds especial usage in providing from a single power supply, the cathode and repeller voltages for operation of a klystron, wherein it is necessary that each of these frequency controlling voltages be regulated and where, further, it is desired to vary the klystron voltage either for initial tuning of the klystron or for the incorporation of an automatic frequency control by klystron repeller voltage control.

The circuit of the present invention was developed to overcome disadvantages previously encountered in the design of the klystron power supplies. It is to be emphasized, however, that the invention is not to be so limited in that the disadvantages encountered in klystron power supply designs are inherent likewise in any multiple output supply where closely regulated voltages are required.

The present invention is therefore generally related to multiple output regulated supplies and since it may be particularly advantageous in providing multiple regulated voltages for klystron operation, a consideration of problems related to klystron multiple supplies may first be considered briefly.

Generally, the operation of a klystron requires closely regulated voltages for the repeller and cathode supply since each of these voltages determine the operating frequency of the klystron and a variation of the magnitude of either the klystron cathode or repeller voltages results in a change of the klystron operating frequency. Thus, when a klystron is to be utilized as a local oscillator in a microwave receiver, for example, it is necessary that the klystron operation be precisely fixed at the desired frequency. Automatic frequency control systems are generally incorporated to insure that the klystron operation frequency is such as to maintain a constant heterodyne beat for subsequent system amplification and detection.

When more than one closely regulated voltage is required, either separate regulated supplies or a series regulator in each of several supply transformer outputs is required. In the case of a klystron, the klystron voltage and the repeller voltage must be closely regulated and the present invention permits but one supply to be incorporated to provide both voltages from a single regulated source.

The present invention then provides a means to develop a first output voltage of, for example, −750 volts, and a second output voltage of, for example, −1500 volts, with the second voltage being variable through, for example, approximately 60 volts without affecting the −750 volt output.

The invention accordingly incorporates a conventional full wave bridge rectifier operating from a regulated supply voltage in conjunction with a voltage doubler circuit, wherein the voltage doubling section derives its output from the already regulated secondary winding of the supply transformer, thus eliminating the necessity for a separate supply winding and providing a regulated output that is twice the −750 volt change.

In addition to providing two output voltages closely regulated from a single supply, the invention further includes means by which the voltage doubler output might be varied independent of the bridge rectifier output in order that the doubler output may be incorporated in an AFC control for klystron operation.

The invention is further featured in a means for electronically varying the voltage doubler output as a function of a discriminator error signal and in the provision of means for selecting predetermined ratios of the full voltage doubler output while maintaining a like variation or swing about the selected output means regardless of the particular ratio of the full output being utilized.

These and other features and objects of the present invention will become apparent upon reading the following description with reference to the accompanying drawings in which.

Figure 1:
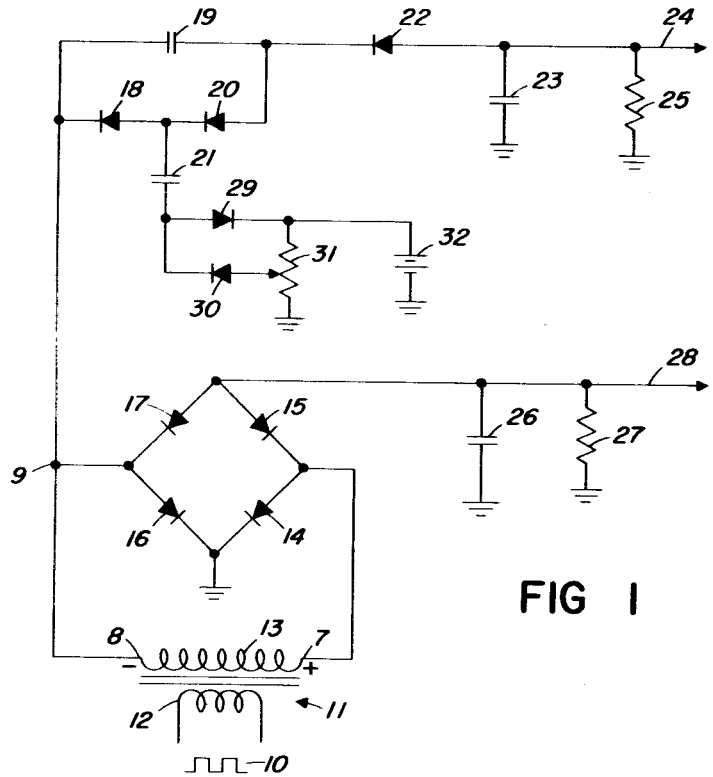
FIGURE 1 is a schematic diagram of the basic embodiment of the present invention.

A basic embodiment of the invention is shown in FIGURE 1. The lower portion of the figure illustrates an input supply signal 10 applied to the primary winding 12 of a power supply transformer 11. Transformer 11 is connected to a first diagonal of a full wave bridge rectifying circuit comprised of diodes 14, 15, 16 and 17. A resistive load member 27 is connected across the other diagonal of the bridge and shunted by a capacitor 26. A first output is taken across the load resistor 27 in the form of a full wave rectified and filtered DC voltage. Output 28 might therefore comprise a constant −750 volt output. The input signal 10 might be a highly regulated signal such that output 28 is a stable and regulated −750 volts. The lower portion of the embodiment of FIGURE 1 is thus seen to be a conventional full wave bridge rectifier power supply circuit.

One terminal of the secondary winding 13 of the power supply transformer 11, is further connected to a voltage doubling network in accordance with the invention. Thus the connection 9 is taken from the end 8 of secondary winding 13 to the voltage doubling circuitry. Line 9 is seen to be connected serially through diode members 18, 20 and 22 to an output terminal 24. Diodes 18, 20 and 22 are serially connected with like polarization such that the cathode of diode 18 connects to the power supply transformer winding 8 while the anode of diode 22 connects directly to the output terminal 24. The series interconnection of diodes 18 and 20 is shunted by a capacitor 19. A load resistor 25 is connected from output terminal 24 to common ground and the load resistor 25 is shunted by a capacitor 23. The junction between diodes 18 and 20 is connected through a capacitor 21 and diode 29 to the positive terminal of a voltage source 32. Voltage source 32 is shunted by a potentiometer 31 the arm of which is connected through diode 30 to the junction between capacitor 21 and diode 29.

In operation, let it be assumed during an initial half cycle of input signal 10 that terminal 7 of the transformer secondary winding is positive as applied to the junction of diodes 14 and 15 in the bridge rectifier. Diode 14 in the bridge will thus be forward-biased such that terminal 7 of transformer secondary winding 13 is connected to ground through diode 14. Terminal 8 of secondary winding 13 then applies a negative potential to the voltage doubling circuitry such that series connected diodes 18, 20 and 22 are forward-biased. Thus the negative voltage is applied to capacitors 19, 21, and 23. No charge is effected on capacitor 19 since both sides of the capacitor are connected to the negative terminal 8 of the power supply secondary winding; the negative voltage being applied directly to the left terminal of the capacitor 19 and through forward-biased diodes 18 and 20 to the right terminal of capacitor 19. Capacitor 23 is seen to be connected directly across the secondary winding of the power supply transformer and charges to the secondary winding voltage which might be −750 volts for a particular application. The negative potential from the transformer winding terminal 8 is also applied to the upper plate of capacitor 21 through forward-biased diode 18 and, since diode 30 is at the instant forward-biased, capacitor 21 charges to the −750 volts applied from the transformer secondary winding plus the voltage $E_1$ which is tapped from potentiometer 31. The charge on capacitor 21 for this particular half cycle then becomes $-(750+E_1)$ volts.

Now consider the following half cycle of input supply signal 10; the relative polarities of terminals 7 and 8 of secondary winding 13 are reversed such that terminal 8 is positive and grounded through the forward-biased diode 16 of the bridge rectifier. The charge accumulated on capacitor 21 in the previous half cycle is then applied to capacitor 19 through diode 20. The return path for capacitor 21 is switched from diode 30 to diode 29 since it is polarized opposite diode 30, and thus the voltage $E_2$ (the entire voltage across potentiometer 31) is in opposition to the charge on 21. Thus the voltage applied to capacitor 19 is equal to the charge accumulated on capacitor 21 during the first half cycle, minus the voltage $E_2$ or $-(750+E_1-E_2)$. The charge on capacitor 19 during the second half cycle is actually the −750 volts applied from the transformer secondary winding minus the difference between the voltages $E_2$ and $E_1$.

Now considering the next reversal of the secondary winding voltage, terminal 8 of the secondary winding is again negative with terminal 7 grounded and capacitor 21 charges as in the first half cycle; the charge on capacitor 19 is added to the transformer secondary winding voltage and transferred to capacitor 23 through diode 22. The output 24 from the voltage doubler is therefore equal to a value of twice the secondary winding voltage of transformer 11 less the difference between the voltages $E_2$ and $E_1$. If the transformer secondary voltage is defined as $E_{S1}$, the output 24 from the voltage doubler may then be expressed as $2E_{S1}-(E_2-E_1)$.

Reference to FIGURE 1 shows that $E_2$ is fixed by the positive DC voltage source 32 and $E_1$ may be chosen as some predetermined fraction of the voltage $E_2$ by adjustment of the arm on potentiometer 31. The variation in the voltage doubler output 24 from the value of twice the secondary voltage of the transformer 11 is thus seen to be subtractive in nature and, by choice of the setting of potentiometer 31, may vary from $2E_{S1}-E_2$ (where $E_1=0$) to $2E_{S1}$ (where $E_1=E_2$).

Figure 2:
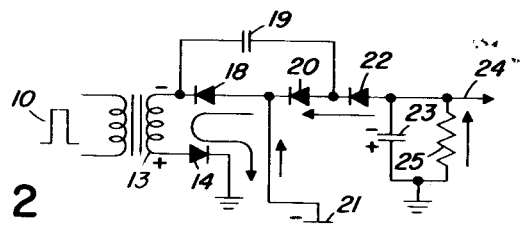
FIGURES 2 and 3 are functional schematic diagrams of the embodiment of FIGURE 1 illustrating the voltage doubler current paths for successive half cycles of the applied voltages.
Figure 3:
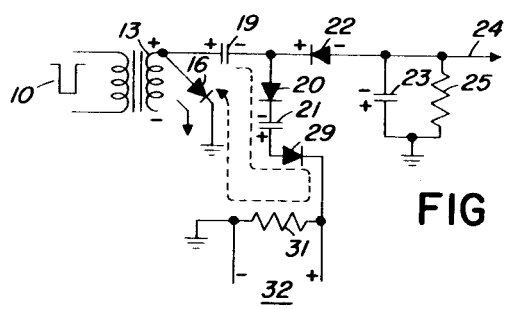

FIGURES 2 and 3 are partial schematics of the embodiment of FIGURE 1 which illustrates the voltage doubler current path for each half cycle of the applied voltage as previously discussed.

FIGURE 2 illustrates the current paths for the first and third half-cycles previously discussed when the transformer secondary winding 13 voltage is of a polarity so as to forward-bias bridge diode 14 while forward-biasing diodes 18, 20 and 22. The return path for capacitor 21 is seen to be through forward-biased diode 30 to the arm of potentiometer 31.

FIGURE 3 illustrates the voltage doubler current paths for the second half cycle previously discussed when the voltage on secondary winding 13 of the input transformer is such as to forward-bias bridge diode 16, and the return path for capacitor 21 is through forward-biased diode 29 to the positive terminal of the voltage source 32.

The embodiment of FIGURE 1 is thus seen to provide from a single transformer secondary winding 13 a first output 28 corresponding to the full wave rectified transformer secondary voltage and a second output 24 the magnitude of which corresponds to twice the transformer secondary voltage minus the difference between two direct current voltages $E_2$ and $E_1$. Voltage $E_1$ has been defined as a selectable portion of the fixed voltage $E_2$, as determined by the setting of the potentiometer 31. If a 750-volt input transformer secondary voltage is assumed output 28 is a fixed −750-volt while the output 24 is a negative voltage with magnitude twice the 750 value less the difference between the voltages $E_2$ and $E_1$. Thus, voltage $E_2$ might be selected as 70 volts such that output 24 may vary from a full value of −1500 volts to −1430 volts. The setting of potentiometer 31 might then establish a mean value of output 24 equal to $-(1500-35)$ volts or −1465 volts, such that the output 24 may vary plus or minus 35 volts about the mean setting of −1465. If the input signal 10 be from a regulated source, both the outputs 28 and 24 will be regulated, the output 28 as a direct full wave rectification of the regulated secondary voltage and the output 24 as a regulated doubling of this voltage less some voltage established by the setting of potentiometer 31.

Figure 4:
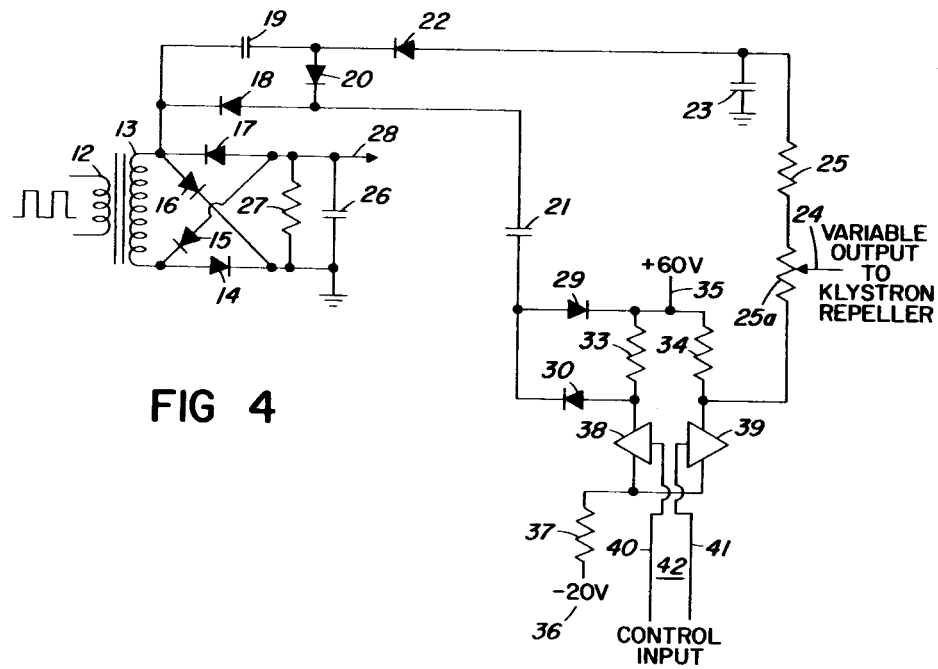
FIGURE 4 is a schematic diagram of an embodiment of the invention including an electronic control means for output voltage variation.

FIGURE 4 illustrates a further embodiment of the basic circuitry of FIGURE 1 wherein the functioning of potentiometer 31 and DC voltage source 32 may be accomplished electronically. The functioning of potentiometer 31 is accomplished electronically as the varying collector voltage of one side of a differential amplifier 42. The fixed DC source 32 may then become the supply source 35 of the differential amplifier 42. With reference to FIGURE 4, diodes 29 and 30 are seen to be connected respectively to the ends of the collector load resistor 33 of a first transistor 38. Diode 29 is thus connected directly to the amplifier supply source 35 while diode 30 is connected to the collector electrode of the amplifier section 38. A variation in the conductivity of transistor 38 is thus reflected as a variation in the collector voltage of transistor 38 due to the drop through the load resistor 33. Thus, variation in the conductivity of the transistor 38 is analogous to the change in this setting of potentiometer 31 of the FIGURE 1 embodiment.

A second section of the differential amplifier 42 is comprised of a further transistor 39 the collector of which is connected through a further load resistor 34 to the supply source 35. The emitter electrodes of transistors 38 and 39 are returned through common resistor 37 to a negative biasing source 36. The output load resistor 25 is returned to the collector of transistor 39 rather than directly to ground. The embodiment of FIGURE 4 includes a variable potentiometer 25a in series with load resistor 25 by means of which the general range of output voltage 24 may be selectively set. If, for example, output 24 were to be used for the repeller voltage of a klystron, the setting of potentiometer 25a would permit a selection of repeller voltage for a particular klystron. By returning the load resistor 25 to the collector of the differential amplifier transistor 39, an increase in the collector voltages of transistor 38 (which is analogous to an increase of voltage $E_1$ of the FIGURE 1 embodiment) is accompanied by a like decrease of the collector voltage of the differential amplifier transistor 39. This arrangement allows a predetermined switch of output voltage 24 independent of the mean value established by the setting of potentiometer 25a. In other words, the ratio by which the potentiometer 25a is dividing down for a particular setting remains a constant. If then a swing of ±35 volts around a selected mean as determined by the setting of potentiometer 25a were to be desired, the differential action allows a ±35 volt variation to be maintained throughout the range of potentiometer settings. This is especially advantageous should the embodiment be utilized in a circuitry for automatic frequency control of a klystron by variation of repeller voltage. The differential amplifier 42, in conjunction with differential input signals, may be designed to establish a given voltage swing about any given mean repeller voltage established by the setting of the output potentiometer 25a.

Figure 5:
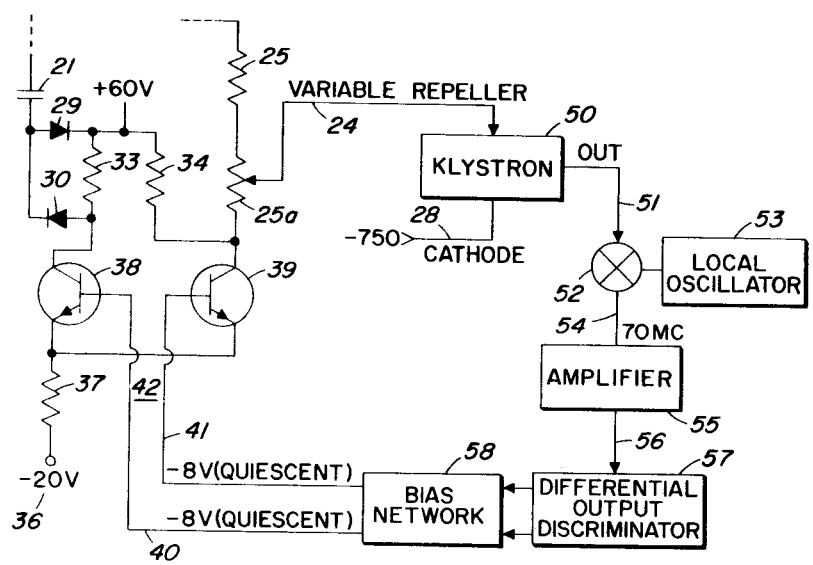
FIGURE 5 is a functional diagram illustrating employment of the invention in combination with a klystron automatic frequency control loop.

Reference is made to FIGURE 5 wherein the embodiment of FIGURE 4 is illustrated functionally as it might be utilized to AFC a klystron. The output 24 from potentiometer 25a is applied as repeller voltage to a klystron 50. The output potentiometer 25a may then be set such that, in conjunction with the fixed cathode voltage 28, the klystron 50 oscillates at a desired frequency. The output 51 from the klystron 50 might then be combined in a mixer 52 with the output of a local oscillator 53 to develop an I.F. frequency 54 of, for example, 70 megacycles. The output 54 from mixer 52 is then amplified in an amplifier 55 and applied to a differential output discriminator 57. The discriminator 57 detects the input signal and when the klystron frequency and local oscillator frequency differ by the desired 70 megacycle value, discriminator 57 would produce no output. If, however, the klystron frequency should change, discriminator 57 would produce an output the polarity of which is dependent on the direction of the frequency shift. In order to establish a quiescent condition which permits variation of repeller voltage 24 on either side of a mean value, the output from discriminator 57 may be applied through a biasing network 58 such that, for example, the quiescent or zero error condition is represented by a —8 volts on each of lines 41 and 40. The differential control signals 40–41, with quiescent value of —8 volts is applied as inputs to the bases of the differential amplifier transistors 38 and 39. For a particular design this 8-volt full quiescent input to each side of the differential amplifier might establish collector voltages of +25 volts. An output from discriminator 57 of one volt for a particular polarity might raise control input 40 to —9 volts while correspondingly lowering control input 41 to —7 volts. This results in a decrease in conductivity of amplifier transistor 38 with corresponding increase in conductivity of amplifier transistor 39. The change in conductivity from the quiescent state is thus reflected in a different subtraction from the voltage doubler output and sensing may be established so that the klystron 50 would respond with a corresponding frequency change to re-establish the desired 70-megacycle output from mixer 52 and return the system to the quiescent or zero error condition.

The embodiment of FIGURES 4 and 5 is thus seen to provide an electronically controlled variation in the output from a voltage doubler. Both the voltage doubler output and the full wave rectified output of the power supply are a direct function of the voltage on the secondary winding of input transformer 11 and each of the outputs may accordingly be regulated by being proportional to the signal regulated source signal 10.

Although the present invention has been described with reference to a particular embodiment thereof it is not to be so limited as changes might be made therein which fall within the scope of the invention as defined by the appended claims.

We claim:

1. A voltage doubler rectifier circuitry comprising an input transformer having a primary winding to which is applied a source of alternating current supply voltage and a secondary winding, means for alternately connecting to ground that one of the respective ends of said secondary winding which is at positive potential during successive half cycles of said input signal, a voltage doubling network connected to one end of said secondary winding, said doubling network comprising first, second and third serially interconnected and like-polarized diodes connected between the connected one of said secondary winding ends and a first output terminal, a first capacitor shunting the serially interconnection of said first and second diodes, a second capacitor having one terminal thereof connected to the junction between said first and second diodes and the second terminal thereof connected respectively to opposite electrodes of fourth and fifth diodes, the cathode electrode of said fourth diode being connected to a positive source of the direct current voltage referenced to ground, means for applying a predetermined portion of said positive direct current voltage to the anode electrode of said fifth diode and a third capacitor and first load impedance each connected between said first output terminal and ground, whereby the voltage developed across said first load impedance has a magnitude equal to twice that of the voltage induced in said transformer secondary winding less the difference between said direct current source magnitude and said predetermined portion thereof as applied to said fourth and fifth diodes respectively.

2. Circuitry as defined in claim 1 wherein said means for applying a portion of said direct current voltage to said fifth diode comprises a first potentiometer shunting said source of direct current voltage, the wiper arm of said first potentiometer being connected to the anode of said fifth diode, said wiper arm being selectively adjustable to apply a predetermined portion of said fixed direct current voltage to the anode of said fifth diode, whereby the voltage across said first load impedance is selectively variable from a maximum magnitude double that of said transformer secondary winding voltage to a minimum magnitude defined by said maximum magnitude less the magnitude of said direct current voltage source.

3. Circuitry as defined in claim 2 wherein said means for shorting the ends of the secondary winding of said transformer to ground comprises sixth and seventh diodes the anodes of which are respectively connected to the ends of said secondary winding and cathodes of which are connected in common to ground reference, a further pair of diodes the anodes of which are connected in common to a second output terminal and the cathodes of which are respectively connected to the anodes of said sixth and seventh diodes, and a further capacitor and second load impedance connected in parallel between said second output terminal and ground, said sixth, seventh, and further pair of diodes forming a full wave bridge rectifier whereby the output between said second output terminal and ground comprises a full wave rectification of the voltage induced in said transformer secondary winding.

4. Circuitry as defined in claim 1 wherein said means for shorting the ends of the secondary winding of said transformer to ground comprises sixth and seventh diodes the anodes of which are respectively connected to the ends of said secondary winding and cathodes of which are connected in common to ground reference, a further pair of diodes the anodes of which are connected in common to a second output terminal and the cathodes of which are respectively connected to the anodes of said sixth and seventh diodes, and a further capacitor and second load impedance connected in parallel between said second output terminal and ground, said sixth, seventh and further pair of diodes forming a full wave bridge rectifier whereby the output between said second output terminal and ground comprises a full wave rectification of the voltage induced in said transformer secondary winding, said positive direct current voltage source comprising the supply voltage for an amplifier, and said means for applying a portion of said direct current voltage source to said fifth diode comprises a load resistor connected between the output electrode of said amplifier and said positive direct current source, the output electrode of said amplifier connected to the anode of said fifth diode, and a variable direct current control signal applied to the control electrode of said amplifier to vary the conductivity thereof and thereby vary the output electrode voltage as applied to said fifth diode as a predetermined portion of said positive direct current source.

5. Circuitry as defined in claim 4 wherein a second amplifier is differentially interconnected with said first amplifier, said further amplifier comprising a load resistor like that of said first amplifier connected between the output electrode thereof and said direct current supply source and having a control electrode, said direct current control signal comprising a differential direct current signal applied between the control electrodes of said first and second amplifiers, said first load impedance including an output potentiometer connected to the output electrode of said second amplifier, the wiper arm of said output potentiometer comprising said first output terminal, whereby variation in the magnitude of said differential direct current control signal as applied to said first and second amplifiers varies the magnitude of the voltage between said first output terminal and ground as selected by the setting of said output potentiometer through a predetermined range which range is independent of the setting of said output potentiometer.

6. Circuitry as defined in claim 1 wherein said positive direct current voltage source comprises the supply voltage for an amplifier, said means for applying a portion of said direct current voltage source to said fifth diode comprising a load resistor connected between the output electrode of said amplifier and said positive direct current source the output electrode of said amplifier connected to the anode of said fifth diode and a variable direct current control signal applied to the control electrode of said amplifier to vary the conductivity thereof and thereby vary the output electrode voltage as applied to said fifth diode as a predetermined portion of said positive direct current source.

7. Circuitry as defined in claim 6 wherein a second amplifier is differentially interconnected with said first amplifier, said further amplifier comprising a load resistor like that of said first amplifier connected between the output electrode thereof and said direct current supply source and having a control electrode, said direct current control voltage comprising a differential direct current signal applied between the control electrodes of said first and second amplifiers, said first load impedance including an output potentiometer connected to the output electrode of said second amplifier, the wiper arm of said output potentiometer comprising said first output terminal, whereby variation in the magnitude of said differential direct current control signal as applied to said first and second amplifiers varies the magnitude of the voltage between said first output terminal and ground as selected by the setting of said output potentiometer through a predetermined range which range is independent of the setting of said output potentiometer.

8. Circuitry as defined in claim 5 wherein said differential control signal varies about a predetermined quiescent value other than zero, said predetermined quiescent value establishing a predetermined like conductivity state in each of said amplifier, and means for varying said differential control signal about said quiescent value to establish a predetermined swing of the voltage at said first output terminal about a mean amplitude established by the quiescent conductivity state of said amplifiers.

9. Circuitry as defined in claim 7 wherein said differential control signal varies about a predetermined quiescent value other than zero, said predetermined quiescent value establishing a predetermined like conductivity state in each of said amplifiers, and means for varying said differential control signal about said quiescent value to establish a predetermined swing of the voltage of said first output terminal about a mean amplitude established by quiescent conductivity state of said amplifier.

References Cited

UNITED STATES PATENTS

| 2,628,338 | 2/1953 | Gould | 307—110 XR |
| 2,682,002 | 6/1954 | Gibson | 321—15 XR |
| 2,956,183 | 10/1960 | Culbertson | 321—15 XR |
| 3,243,683 | 3/1966 | Ackley | 321—15 XR |
| 3,337,787 | 8/1967 | Joseph | 321—15 XR |

FOREIGN PATENTS 686,311   5/1964   Canada.

JOHN F. COUCH, *Primary Examiner.*

WM. SHOOP, *Assistant Examiner.*